United States Patent

Takahata et al.

[11] 3,889,278
[45] June 10, 1975

[54] ELECTRIC SHUTTER CONTROL CIRCUIT

[75] Inventors: Hisatoshi Takahata; Kohji Tanikawa, both of Shimosuwamachi, Japan

[73] Assignee: Yashika Co., Ltd., Tokyo, Japan

[22] Filed: May 13, 1973

[21] Appl. No.: 365,427

[30] Foreign Application Priority Data

June 6, 1972 Japan.............................. 47-56329

[52] U.S. Cl.................... 354/50; 354/51; 354/60 R; 354/60 L
[51] Int. Cl. ............................................. G03b 7/08
[58] Field of Search .... 95/10 CT; 354/50, 51, 60 R, 354/60 EI, 60 L

[56] References Cited
UNITED STATES PATENTS 3,742,826  7/1973  Kohtani ........................... 95/10 CT
3,748,979  7/1973  Wada............................... 95/10 CT

*Primary Examiner*—Samuel S. Matthews
*Assistant Examiner*—Russell E. Adams, Jr.
*Attorney, Agent, or Firm*—Charles E. Pfund, Esq.

[57] ABSTRACT

An electric shutter control circuit comprising a pulse oscillator producing pulses at a pulse frequency corresponding to photographing conditions such as illumination intensity of the scene and a counting and memorizing means for memorizing and indicating the output of the pulse oscillator prior to the shutter releasing. Upon the subsequent action of opening the shutter pulses at a predetermined pulse frequency are supplied to the counting and memorizing means, and the time required for shifting the content of the counting and memorizing means to the last stage thereof is made the shutter time. The shutter time is thus controlled totally digitally and is unaffected by temperature, and it can also be indicated

4 Claims, 3 Drawing Figures

ELECTRIC SHUTTER CONTROL CIRCUIT

BACKGROUND OF THE INVENTION

This invention relates to electric shutter circuits and, more particularly, to electric shutter control circuits for controlling the shutter such as to have right and proper shutter time corresponding to photographing conditions such as illumination intensity of the scene, film sensitivity and stop value.

The electric shutter control circuit is operated to electrically control the shutter according to the illumination intensity of the scene, film sensitivity and stop value so as to obtain right and proper exposure of the light-sensitive surface of the film.

The usually employed electric shutter control circuit has a construction comprising a light-sensitive element having a variable resistance according to the illumination intensity of the scene, a capacitor serving as time limiter connected through the light-sensitive element to a power supply, and a shutter circuit acting to close a previously open shutter when the terminal voltage across the capacitor reaches a predetermined level. The capacitor is charged in response to the action of opening the shutter with charging current corresponding to the illumination intensity of the scene, and the shutter is closed when the terminal voltage across the capacitor is increased to the predetermined level, thereby obtaining right and proper exposure.

In the electric shutter control circuit of this construction, however, the shutter time is set by using analog current corresponding to the illumination intensity of the scene. Therefore, various parts of the circuit are subject to the influence of temperature, thus giving rise to a great error. Besides, since the shutter is controlled according to an analog quantity memorized the actual exposure is prone to errors, and the shutter time cannot be indicated.

SUMMARY OF THE INVENTION

Accordingly, it is the primary object of this invention to provide an electric shutter control circuit, which is not adversely affected by external conditions.

Another object of the invention is to provide an electric shutter control circuit, which can operate reliably and with high precision.

A further object of the invention is to provide an electric shutter control circuit, which readily permits the display of the shutter time.

A still further object of the invention is to provide an electric shutter control circuit, which has a simple circuit construction and controls the shutter with digital signals.

In the electric shutter control circuit according to the invention to achieve the above objects, output pulses at a pulse frequency corresponding to the scene intensity produced from a pulse oscillator are memorized and indicated by a counting and memorizing circuit, and the time required to shift the memorized content to a predetermined stage of the counting and memorizing circuit by supplying pulses at a predetermined frequency in response to the subsequent action of opening the shutter is made the shutter time.

BRIEF DESCRIPTION OF THE DRAWINGS

The above and other objects and novel features of the invention will become more apparent from the following description having reference to the accompanying drawings, in which.

DESCRIPTION OF THE PREFERRED EMBODIMENTS

Figure 1:
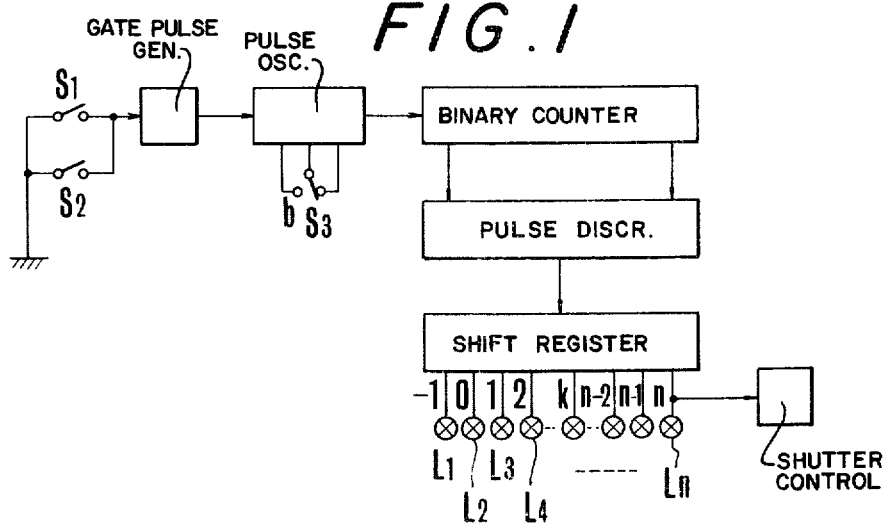
FIG. 1 is a block diagram showing an embodiment of the electric shutter control circuit according to the invention.

Referring now to FIG. 1, which shows an embodiment of the electric shutter control circuit according to the invention, reference symbol $S_1$ designates a trigger switch which is momentarily closed together with the closure of a power supply switch when a shutter release button, not shown, is slightly depressed, symbol GC a gating circuit triggered by a trigger pulse supplied through the trigger switch $S_1$ to generate a pulse signal having a pulse width corresponding to the value of the stop and the sensitivity of the film, symbol PO a pulse oscillator receiving the output of the gating circuit GC as input and producing a train of pulses at a pulse frequency corresponding to the illumination intensity of the scene only during the presence of the input signal, symbol CT a binary counter to count the output pulses of the pulse oscillator, symbol PC a pulse discriminating section to produce output only when the output of the binary counter is a power of 2, symbol SL a shift register receiving the output of the pulse discriminating section PC as input, symbols $L_1$ to $L_n$ indicating means such as luminous diodes connected to respective output terminals of the shift register SL, and symbols $S_2$ and $S_3$ switches interlocked to the operation of depressing a shutter release button, not shown, to be switched to one state at the time of opening the shutter and returned to the other state at the time of closing the shutter. When the switch $S_3$ is switched, the pulse oscillator PO also produces a train of pulses such that the shift register SL is shifted to the last stage. Symbol SC designates a shutter control section connected to a predetermined output terminal of the shift register SL. When it is coupled with an input, it acts to close a shutter that has previously been open.

The operation of the electric shutter control circuit of the above construction will now be described.

When the shutter release button, not shown, is depressed to a slight extent, the trigger switch $S_1$ is closed together with the power supply switch, not shown, so that the trigger pulse is supplied to the gating circuit GC. As a result, the gating circuit GC produces a pulse output having a pulse width corresponding to the value of the stop and the sensitivity of the film, the output being supplied to the pulse oscillator PO. With the input to the pulse oscillator PO, it produces a train of output pulses at a pulse frequency proportional to the illumination intensity of the scene only during the presence of the input, its output being supplied to the binary counter CT, so that a number of pulses corresponding to the stop value, film sensitivity and scene intensity is counted by the binary counter CT. The pulse discriminating section PC provides a detection pulse signal to the shift register only when the output of the binary counter CT is a power of 2, that is, only when only one of a plurality of output terminals of the binary counter CT comes up with output "1". The content of the shift register is thus progressively shifted as the number of pulses counted by the binary counter CT successively reaches 1, 2, 4, . . . , $2^n$, so that the indicating sections $L_1$ to $L_k$ are successively turned on with the progress of the shift register content through respective output terminals up to the output terminal k. The memorized and indicated value at position k of the shift register SL thus represents a shutter time for obtaining right and proper exposure.

With the subsequent depression of the shutter release button to a further extent, the shutter is opened, whereupon the switches $S_2$ and $S_3$ are switched. As a result, a trigger signal is supplied through the switch $S_2$ to the gating circuit GC, so that a pulse output having a predetermined pulse width is supplied to the pulse oscillator in a similar way to that mentioned earlier. Also, since the switch $S_3$ of the pulse oscillator PO is switched in response to the action of opening the shutter, with the output of the gating circuit GC the oscillator provides a train of pulses at a predetermined pulse frequency to the binary counter CT. The binary counter CT counts pulses successively supplied from the pulse oscillator PO, and its successive outputs are supplied to the pulse discriminating section PC. The pulse discriminating section PC discriminates the outputs of the binary counter CT, and it provides a pulse signal to the shift register SL every time the output of the binary counter CT coincides with a power of 2, that is, every time when only one of the plurality of the output terminals of the binary counter CT comes up with output "1", thus progressively shifting the memorized value from the position k in the shift register SL. When the memorized value in the shift register SL is shifted to a predetermined output stage, for instance the last output stage n as shown in FIG. 1, the shutter control section SC is actuated to close the shutter that has previously been open, thus completing the photographing. Here, if the (n-1)-th output of the shift register SL is assumed to represent $2^{-x}$ sec., the k-th output represents $2\{^{(n-1)-k}\}^{-x}$ sec. Since the interval between the n-th output and k-th output is $2\{n-1\}-1$, the time required for the shifting from the k-th output to the n-th output, i.e., the shutter time $T_s$, is given as $$T_s = 2 \{ ^{(n-k)-1} \} \times 2^{-x} = 2 \{ ^{(n-1)-k} \}^{-x}$$

Thus, with the circuit of the above construction the shutter is controlled to the shutter time that has been memorized and indicated in the shift register right before the start of the photographing according to the stop value, film sensitivity and scene intensity. At the time of the completion of the photographing the switches $S_2$ and $S_3$ and the binary counter CT are reset in response to the action of closing the shutter. While in the foregoing description the output of the switch $S_2$ is supplied to the gating circuit GC, it is only required for the switch $S_2$ to cause the pulse oscillator PO to produce output in an interlocked relation to the action of opening the shutter.

Figure 2:
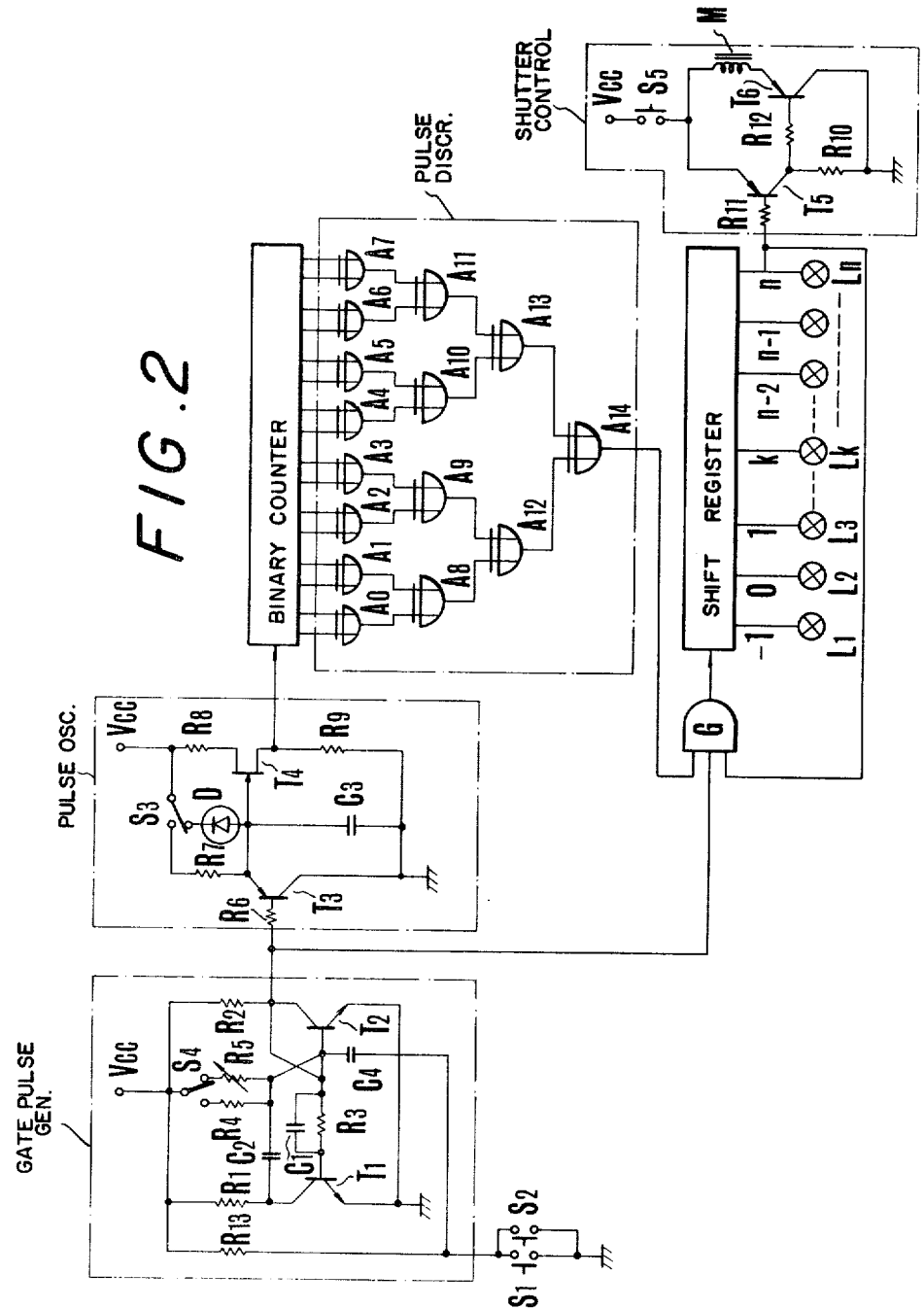
FIG. 2 is a schematic diagram showing the circuit construction of another embodiment of the electric shutter control circuit according to the invention.

FIG. 2 shows an example of the circuit construction of the electric shutter control circuit according to the invention, and in which the corresponding parts to those in FIG. 1 are designated by the same reference symbols. In the Figure reference symbol $T_1$ designates a first transistor connected in series with a resistor $R_1$ between a power supply terminal $V_{cc}$ and earth, symbol $T_2$ a second transistor connected in series with a resistor $R_2$ between the power supply terminal $V_{cc}$ and earth, symbols $R_3$ and $C_1$ respectively designate a resistor and a capacitor connected in parallel with each other between the base of the first transistor $T_1$ and collector of the second transistor $T_2$, symbol $C_2$ a capacitor connected between the collector of the first transistor $T_1$ and base of the second transistor $T_2$, and symbol $S_4$ a switch for selectively connecting a resistor $R_4$ and a variable resistor $R_5$ adjustable according to the sensitivity of the film and the value of the stop between the power supply terminal $V_{cc}$ and base of the second transistor $T_2$. The switching action of the switch $S_4$ is interlocked to the operation of opening the shutter not shown. The above elements constitute a mono-stable multi-vibrator producing output according to the time constant of the circuit of capacitor $C_2$ and resistor $R_4$ or variable resistor $R_5$. Symbol $T_3$ designates a third transistor with the base thereof connected through a resistor $R_6$ to the collector of the second transistor $T_2$, symbols $R_7$ and D respectively designate a resistor and a light-sensitive element switched over to each other by the switch $S_3$ for connection between a power supply terminal and the emitter of the third transistor $T_3$, symbol $C_3$, a capacitor connected between the emitter and collector of the third transistor $T_3$, and symbol $T_4$ a fourth and field-effect transistor connected to the emitter of the third transistor $T_3$. These elements constitute the pulse oscillator PO. Symbols $A_0$ to $A_{14}$ designate exclusive OR circuits. These exclusive OR circuits $A_0$ to $A_{14}$ constitute the pulse descriminating circuit PC. Symbol G designates a gate, which receives the output of the gating circuit GC, the output of the pulse discriminating section PC and the last stage output of the shift register SL as respective inputs, and whose output is added to an input terminal of the shift register SL. A fifth transistor $T_5$ connected in series with a resistor $R_{10}$ and a switch $S_5$ between a power supply terminal $V_{cc}$ and earth has its base connected through a resistor $R_{11}$ to the last stage output terminal of the shift register SL. A sixth transistor $T_6$ has its base connected through a resistor $R_{12}$ to the collector of the fifth transistor $T_5$. An electromagnet M is connected through the switch $S_5$ between the power supply terminal $V_{cc}$ and the emitter of the sixth transistor $T_6$. The electromagnet M serves to hold the shutter in the open state.

With the electric shutter control circuit of the above construction, by depressing a shutter release button, not shown, to a slight extent a power supply switch is closed to couple the power supply to the individual sections. When the power supply $V_{cc}$ is connected to the gating circuit GC, the supply voltage $V_{cc}$ is coupled through the switch $S_4$ and the registor $R_5$ adjusted according to the film sensitivity and stop value to the base of the second transistor $T_2$ to trigger the second transistor $T_2$. When the second transistor $T_2$ is triggered, the third transistor $T_3$, which receives the collector potential on the second transistor $T_2$, is also triggered to short-circuit the capacitor $C_3$.

In this state, no input is supplied to the fourth transistor $T_4$, and the pulse oscillator PO produces no output.

By subsequently depressing the shutter release button to a further extent, the trigger switch $S_1$ is closed, so that the capacitor $C_4$ is connected between the base of the second transistor $T_2$ and earth and charged. In the initial stage of the charging of the capacitor $C_4$ large current flows to lower the base potential on the second transistor $T_2$ to a level below the threshold level, so that the second transistor $T_2$ is cut off. When the second transistor $T_2$ is cut off, the first transistor $T_1$, which receives the collector potential on the second transistor $T_2$, is triggered, causing current corresponding to the film sensitivity and stop value through the path constituted by the switch $S_4$, variable resistor $R_5$, capacitor $C_2$, and first transistor $T_1$ to earth, so that the capacitor $C_2$ is gradually charged according to the time constant of the circuit of variable resistor $R_5$ and capacitor $C_2$. Since the charging of the capacitor $C_4$ has already been completed, with the gradual charging of the capacitor $C_2$ the base potential on the second transistor $T_2$ is gradually increased, and upon the reaching of its threshold level the second transistor $T_2$ is triggered to cut off the first transistor $T_1$. The gating circuit of this construction thus constitutes a mono-stable multi-vibrator, and it provides output only for a predetermined period from the instant of closing of the trigger switch $S_1$ and determined by the variable resistor $R_5$ adjusted according to the film sensitivity and stop value and the capacitor $C_2$. The pulse width of the output pulse produced from the gating circuit GC thus varies according to the film sensitivity and stop value. The output of the gating circuit GC is coupled through the resistor $R_6$ to the base of the third transistor $T_3$, so that the third transistor $T_3$ is rendered "off" only during the presence of this output. During this time, the capacitor $C_3$ is gradually charged with current corresponding to the scene intensity supplied through the light-sensitive element D. When the terminal voltage across the capacitor $C_3$ reaches the threshold level of the fourth transistor $T_4$, the fourth transistor $T_4$ is triggered, but it is cut off again as the capacitor $C_3$ is discharged. As a result, a train of output pulses at a pulse frequency corresponding to the scene intensity is produced from the output terminals of the pulse oscillator PO, that is, across the resistor, only for the period of presence of the output of the gating circuit GC, these pulses being counted in the binary counter CT. The successive outputs of the binary counter CT are discriminated through the exclusive OR circuits $A_0$ to $A_{14}$, which produces an output pulse only when an input signal "1" constitutes one of the inputs of the exclusive OR circuits $A_0$ to $A_7$. Thus, the pulse discriminating section PC produces successive outputs every time the count content of the binary counter CT reaches a power of 2. In this way, a number of pulses equal to a power of 2 corresponding to the film sensitivity, stop value and scene intensity is memorized and indicated by the shift register SL, and the indicated value represents a shutter time for obtaining right and proper exposure.

By subsequently depressing the shutter release button to a further extent, the switches $S_3$ and $S_4$ are both transferred, and also the switches $S_2$ and $S_5$ are closed to open the shutter not shown, whereupon current is caused through the path of switch $S_5$, electromagnet M and sixth transistor $T_6$ to earth to hold the shutter in the open state.

Meanwhile, since the switch $S_4$ is transferred, upon closure of the switch $S_2$ a pulse signal having a pulse width determined by the time constant of the circuit of capacitor $C_2$ and resistor $R_4$ is supplied from the gating circuit GC to the pulse oscillator PO. Also, since the switch $S_3$ has been transferred, with the supply of the output of the gating circuit GC to the pulse oscillator PO the capacitor $C_3$ is charged through the resistor $R_7$. When the terminal voltage across the capacitor $C_3$ reaches a predetermined level, the fourth transistor $T_4$ is triggered, causing the discharging of the capacitor $C_3$ through the fourth transistor $T_4$. As a result, a train of pulses at a predetermined pulse frequency determined by the time constant of the circuit of resistor $R_7$ and capacitor $C_3$ is produced from the pulse oscillator PO. These pulses are counted by the binary counter CT, and they are discriminated by the pulse discriminating section PC, whose output is supplied through the gate G to the shift register SL. The content of the shiftregister SL is thus progressively shifted from the position $k$, at which the value corresponding to the film sensitivity, stop value and scene intensity determined prior to the photographing is memorized. When the shift register content is shifted to the last output stage $n$, the output of the shift register is supplied through the resistor $R_{11}$ to the base of the fifth transistor $T_5$ to trigger the fifth transistor $T_5$. As a result, the voltage drop developed across the resistor $R_{10}$ is impressed on the base of the sixth transistor $T_6$ to cut off the sixth transistor $T_6$, so that the electromagnet releases and closes the shutter. It is to be noted that with the shutter control circuit of the above construction the time required for the memorized value memorized at the position $k$ of the shift register SL prior to the photographing to be shifted to the last stage n by the output at a constant frequency produced from the pulse oscillator PO, that is, a value based on the variable ($n-k$), represents the shutter time. Thus, with increase of the film sensitivity or reduction of the stop value the pulse length of the pulse output supplied from the gating circuit GC in the measuring period prior to the photographing is increased for the same scene, so that the memorized value k in the shift register is increased, that is, the shutter time ($n-k$) for obtaining the right and proper exposure is reduced. Also, when only the scene intensity is increased, the resistance of the light-sensitive element D is reduced, so that the oscillating frequency of the pulse oscillator in the measuring period is increased according to the scene intensity. Thus, the memorized value $k$ in the shift register SL is increased, that is, the shutter time ($n-k$) for obtaining the right and proper exposure is reduced.

As has been shown, with the electric shutter control circuit of the above construction the content of the shift register shifted in accordance with the film sensitivity, stop value and scene intensity is memorized and indicated, and the time required for the shifting from the memorized position to the last stage of the shift register at a constant speed and in response to the action of opening the shutter is made the shutter time, so that the control is totally digital. Thus, it is possible to perfectly eliminate the effects of the temperature. The switches $S_2$ to $S_5$ are recovered in response to the action of closing the shutter, and the content of the shift register SL is indicated by the indicating means $L_1$ to $L_n$.

Figure 3:
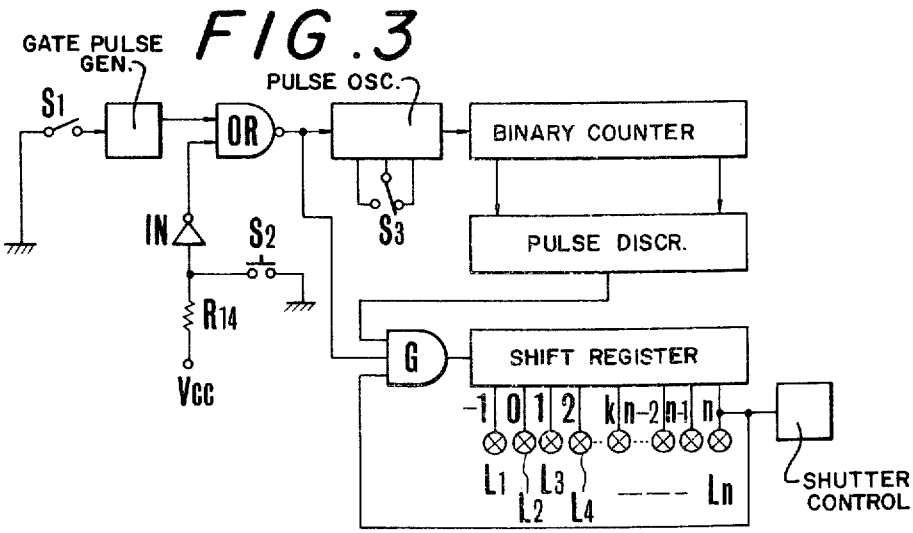
FIG. 3 is a block diagram showing a further embodiment of the electric shutter control circuit according to the invention.

FIG. 3 shows a different embodiment of the electric shutter control circuit according to the invention, and in which the same parts as those in FIG. 2 are designated by like reference symbols. In the Figure, symbol IN designates an inverter connected through a resistor $R_{14}$ to a power supply terminal $V_{cc}$, symbol $S_2$ a normally open switch for connecting the input terminal of the inverter IN to earth, and symbol OR an OR circuit receiving the output of gating circuit GC and the output of the inverter IN and producing output supplied to pulse oscillator PO and gate G. With this construction, similar measurement to that mentioned earlier is made to memorize the resultant value in shift register SL, and by subsequently opening the shutter, not shown, the switch $S_2$ is closed in response to the action of opening the shutter, so that the inverter IN provides output "1" to the OR gate, whose output is in turn supplied to the pulse oscillator PO and gate G.

With the circuit of the above construction the shutter time may be set similar to the previous embodiment of FIG. 2 not by operating the gating circuit GC at the time of opening the shutter but by supplying the output of the switch $S_2$ actuated in response to the action of opening the shutter through the inverter IN and OR gate OR to the pulse oscillator PO. Thus, in this construction the switch $S_4$ and resistor $R_4$ in the gating circuit GC shown in FIG. 2 are not needed.

While in the preceding embodiments the reset circuits for the binary counter and shift register are omitted, the resetting can be readily done by interlocking it to the shutter release button or shutter.

As has been described in the foregoing, with the electric shutter control circuit according to the invention the shutter time is set by using a digital signal corresponding to the film sensitivity, stop value and scene intensity, so that it is not affected by temperature. Thus, it is possible to extremely reduce errors responsible to the circuit. Also, according to the invention the circuit construction is extremely simplified by the provision of the pulse discriminating section for discriminating the outputs of the binary counter for every power of 2. Further, according to the invention the measured value can be digitally memorized and indicated even with the very simple circuit construction.

Furthermore, since according to the invention the time required for the memorized and indicated value memorized in the shift register to be shifted to the last stage is made the shutter time, the checking of the operation of the shutter can be very readily done.

What is claimed is:

1. An electric shutter control circuit comprising a first pulse oscillator means for producing a train of pulses at a pulse frequency corresponding to the illumination intensity of the scene to be photographed, control means for establishing a time interval in accordance with exposure parameters other than scene brightness, a multi-stage counting and memorizing means operable prior to an exposure for counting and memorizing the number of pulses produced from said first pulse oscillator means during said interval, a second pluse oscillator means for producing a train of pulses at a predetermined pulse frequency and operable after said interval for shifting the content of the counting and memorizing means to the last stage thereof, and a shutter circuit receiving the last stage output of said counting and memorizing means including means responsive to the time required for shifting the content of said counting and memorizing means to the last stage thereof for controlling the open time of a shutter.

2. An electronic shutter control circuit according to claim 1, which further comprises indicating means provided at individual output stages of said counting and memorizing means, said indicating means indicating the shutter speed.

3. An electric shutter control circuit according to claim 1, which includes a first switch interlocked to the operation of depressing a shutter release button said control means comprising, a pulse generator producing in response to the action of said first switch a pulse having a time length corresponding to photographing conditions such as stop value and film sensitivity, said pulse generator producing a pulse having a predetermined time length for existing said conditions in response to the action of opening the shutter, and a said first pulse oscillator oscillated means in a preliminary shutter-off stage prior to the photographing in response to the output of said pulse generator at a pulse frequency corresponding to the illumination intensity of the scene to be photographed, said second pulse oscillator means being oscillated in response to the action of opening the shutter during the presence of the output produced from said pulse generator at a predetermined frequency sufficient to shift the content of said counting and memorizing means to the last stage thereof, and in which said counting and memorizing means comprises a binary counter to count the output pulses of said pulse oscillator, a discriminating means for producing only output signals from said binary counter representing powers of 2 and a shift register memorizing the output of said discriminating means.

4. An electric shutter control circuit according to claim 1, which includes a first switch interlocked to the operation of depressing a shutter release button said control means comprising, a pulse generator producing in response to the action of said first switch a pulse having a time length corresponding to photographing conditions such as stop value and film sensitivity, and said first pulse oscillator means oscillated in a preliminary shutteroff stage prior to the photographing in response to the output of said pulse generator at a pulse frequency corresponding to the illumination intensity of the scene to be photographed, said second pulse oscillator means being oscillated at the time of opening of the shutter in response to the output of a second switch actuated upon the action of opening the shutter to produce pulses at a predetermined frequency sufficient to shift the content of said counting and memorizing means to the last stage thereof, and in which said counting and memorizing means comprises a binary counter to count the output pulses of said pulse oscillator, a discriminating means for producing only output signals from said binary counter representing powers of 2 and a shift register memorizing the output of said discriminating means.

* * * * *